No. 877,030.         PATENTED JAN. 21, 1908.
K. E. ZIX.
MOTOR CONTROL.
APPLICATION FILED JULY 25, 1906.

Witnesses:

Inventor
Karl Eduard Zix.
by Att'y.

UNITED STATES PATENT OFFICE.

CARL EDUARD ZIX, OF BERLIN, GERMANY, ASSIGNOR TO GENERAL ELECTRIC COMPANY, A CORPORATION OF NEW YORK.

MOTOR CONTROL.

No. 877,030.

Specification of Letters Patent.

Patented Jan. 21, 1908.

Application filed July 25, 1906. Serial No. 327,676.

*To all whom it may concern:*

Be it known that I, CARL EDUARD ZIX, a subject of the Emperor of Germany, residing at Berlin, Germany, have invented certain new and useful Improvements in Motor Control, of which the following is a specification.

My invention relates to the control of electric motors from a distance, and particularly to the control of motors driving a member, such as a railway track switch, which must be reciprocated.

In order to reverse an electric motor with the minimum number of leads from the source of current to the motor, it has frequently been the practice heretofore to divide the field winding of the motor into two portions, to the junction of which one terminal of the armature is connected. The other armature terminal is connected to one terminal of the source, and the other terminal of the source is connected alternately to the two outer terminals of the two field portions, for opposite directions of rotation. Such an arrangement requires only three leads, or if earth is used for one connection, only two leads. This arrangement has the disadvantage, however, that half the field winding is always idle.

The object of my invention is to increase the output of such a motor without increasing the number of control leads. I accomplish this by connecting in shunt to the armature the portion of the field winding which, in the ordinary arrangement, is idle. This shunt connection may be made without increasing the number of leads, and by its use all the field winding is active for both directions of rotation.

My invention further comprises arranging a manually-controlled switch and means controlled by the movement of the motor coöperating with the manually-controlled switch to make the connections described above, and also to break the motor circuit automatically when the driven member reaches its limit of movement in either direction.

Figure 1:
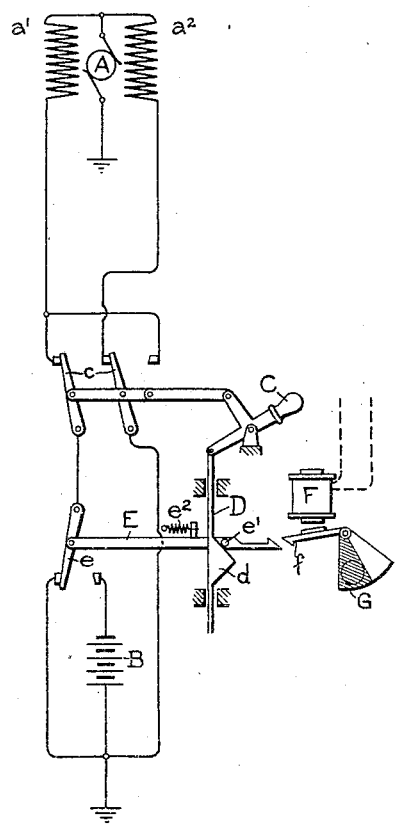
Figure 2:
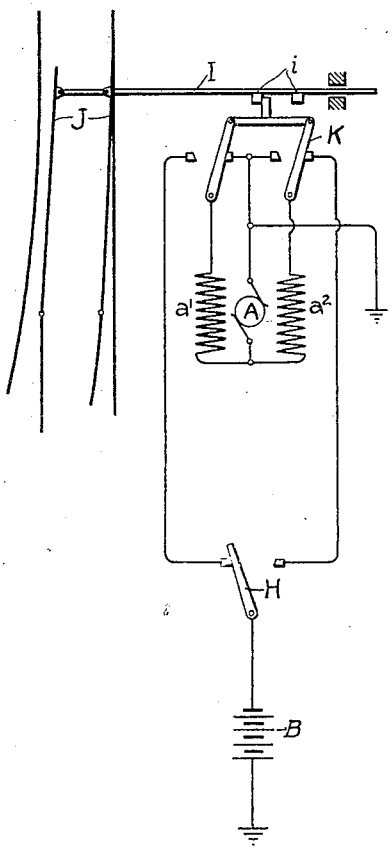

My invention will best be understood by reference to the accompanying drawing, in which Figure 1 shows an electric motor arranged for control in accordance with my invention; and Fig. 2 shows a modification thereof.

In Fig. 1, A represents the motor armature, and $a^1$ and $a^2$ represent the two halves of the field winding, to the junction of which one armature terminal is connected. The other armature terminal is connected through ground to one terminal of the source of current indicated by the battery B.

C represents a controlling handle connected to the switch contacts $c$ in circuit with the outer terminals of the two field portions.

D represents a vertical reciprocating member carrying a cam portion $d$ adapted to engage a pin $e^1$ on the horizontally-reciprocating member E, so as to move member E toward the right in Fig. 1 whenever member D is moved up or down.

$e^2$ represents a spring, which acts to return member E when released to the position shown in the figure. Member E carries a contact $e$, and at its opposite end is arranged to be engaged by a catch $f$ controlled by the armature of electromagnet F. This electromagnet may be controlled by the track switch or other device driven by the motor A in any of the well known methods ordinarily employed in interlocking machines for railway switches and signals. The armature of this magnet may also control an indicator G to give a return indication of the movement of the device driven by the motor.

The operation of the switches shown in Fig. 1 is as follows: With the switches in the position shown, the upper terminal of the battery B is open-circuited, and no current flows. Now, if handle C is moved downward and contacts $c$ thrown to the opposite position, the upward movement of the cam $d$ will throw member E toward the right into position to be locked by catch $f$. This movement of member E shifts switch contact $e$ to the right. A circuit is then closed from the upper terminal of the battery, through switch $e$, through left-hand switch $c$, to the outer terminal of field winding $a^2$. Passing from this portion of the field winding, the current divides, part passing through armature A and earth to the lower terminal of battery B, and the other part passing through the field portion $a^1$ and through the right-hand switch $c$ to the lower battery terminal. Field portion $a^2$ is thus connected in series with the armature, and field portion $a^1$ in shunt to armature. Now, when magnet F is energized momentarily by a completion of the movement of the device driven by the motor, its armature is raised, unlatching the catch F and permitting member E to be returned to the position shown by the spring $e^2$.

Now, if handle C is raised again to the position shown in Fig. 1, switches c will be returned to the position shown, and the downward movement of the member d will again shift member E toward the right to be latched by catch f. The circuit is then closed from the upper terminal of battery B through switch e and left-hand switch c to the outer terminal of field portion $a^1$. After passing through this field portion, the current divides, part passing through the armature, and thence through earth to the lower terminal of battery B; the other part passing through field portion $a^2$ and right-hand switch c to lower terminal of battery B. Field portion $a^1$ is now in series to the armature and field portion $a^2$ in shunt, and the direction of current through both field portions has been reversed. The motor consequently rotates in the other direction. When the limit of movement is reached, the magnet F is again momentarily energized, and member E is released, returning switch e to the position shown in the figure, and breaking the motor circuit. All parts will then be restored to the position shown in Fig. 1.

It will be seen that after the movement of the device driven by the motor has been completed and member E returns to the position shown in the drawing, switch e connects together the two outer terminals of the motor field portions, so that any leakage current due to a ground on any circuit will pass through the two portions of the field winding in opposite directions, so that no torque will be produced in the motor. Thus, the motor when at rest is completely protected from leakage currents.

In Fig. 2 I have shown a somewhat modified arrangement of circuits, the connecting together of the outer terminals of the two portions of the field winding when the motor is at rest being omitted in order to simplify the figure. I have shown a simple two-throw switch H arranged to connect one terminal of battery B to either of two leads which extend to the motor. I have shown in this figure a reciprocating member I connected to a track-switch J, which member is geared to the motor in any suitable way, so as to be driven thereby. A switch K is controlled by lugs i on the member I.

The operation of this modification is as follows: With switches H and K in the position shown, the circuit of the battery B is opened. In order to shift the track switch, switch H is thrown to its other position, thereby closing a circuit from the upper terminal of battery B to switch K, thence through field portion $a^2$, and thence in parallel through the motor armature, field portion $a^1$, to ground, and thence to the lower battery terminal. The motor consequently starts, shifting member I toward the left. When the limit of movement is reached the right-hand lug i engages switch K, and throws it to the left; thereby opening the circuit of the motor. To return the track switch to its other position, switch H is returned to the position shown in the drawing. A circuit will then be closed from the upper terminal of battery B, through switch K, to field portion $a^1$, and thence through the armature and field portions $a^2$ in parallel. The motor then rotates in the opposite direction, shifting member I toward the right until the left-hand lug i engages switch K and returns it to the position shown in Fig. 2. The device driven by the motor thus controls directly a switch in the motor circuit, instead of indirectly, as in Fig. 1.

Many other modifications may be employed, and consequently I do not desire to limit myself to the particular construction and arrangement of parts here shown, but aim in the appended claims to cover all modifications which are within the scope of my invention.

What I claim as new, and desire to secure by Letters Patent of the United States, is,—

1. In combination, an electric motor having a divided field winding, a source of current therefor, and controlling means adapted to connect one portion of the field winding in series with the motor armature and the second portion in shunt for one direction of rotation and to connect the second portion in series and the first in shunt for the opposite direction of rotation.

2. In combination, an electric motor having a divided field winding, a source of current therefor, a connection from one armature terminal to the junction of the two field portions, a connection from the other armature terminal to one terminal of the source, and means for connecting the outer terminal of each field portion alternately to the two terminals of the source to reverse the motor.

3. In combination, an electric motor having a divided field winding and one armature terminal connected to the junction of the two field portions, a member to be reciprocated by said motor, a source of current at a distant point, a connection from the second armature terminal to one terminal of the source, two leads from the source to the motor, a switch at the source arranged to connect the second terminal of the source alternately to said two leads, and a switch controlled by the movement of the motor arranged to connect the outer terminal of each field portion alternately to one of said leads and to the second armature terminal.

4. In combination, an electric motor having a divided field winding, a member to be reciprocated thereby, a source of current for the motor, a manually-controlled switch, and means controlled by the movement of the motor coöperating with said switch to connect each portion of the field alternately in series and in shunt to the armature for opposite directions of rotation and to break the motor circuit automatically when the reciprocating member has completed its movement in either direction.

5. In combination, an electric motor having a divided field winding, a source of current therefor, controlling means adapted to connect one portion of the field winding in series with the motor armature and the second portion in shunt for one direction of rotation, to connect the second portion in series and the first in shunt for opposite direction of rotation, and to connect the two field portions in parallel when the motor is at rest.

6. In combination, an electric motor having a divided field winding, a source of current therefor, a connection from one armature terminal to the junction of the two field portions, a connection from the other armature terminal to one terminal of the source, and means for connecting the outer terminal of each field portion alternately to the two terminals of the source to reverse the motor and for disconnecting the outer terminals of the field portions from the source and connecting them together to stop the motor.

In witness whereof, I have hereunto set my hand this 7th day of July, 1906.

CARL EDUARD ZIX.

Witnesses:
 JULIUS RUMLAND,
 MUN HANDLEE.